R. A. YOUNG.
DIRIGIBLE HEADLIGHT.
APPLICATION FILED NOV. 1, 1916.
1,231,980.
Patented July 3, 1917.
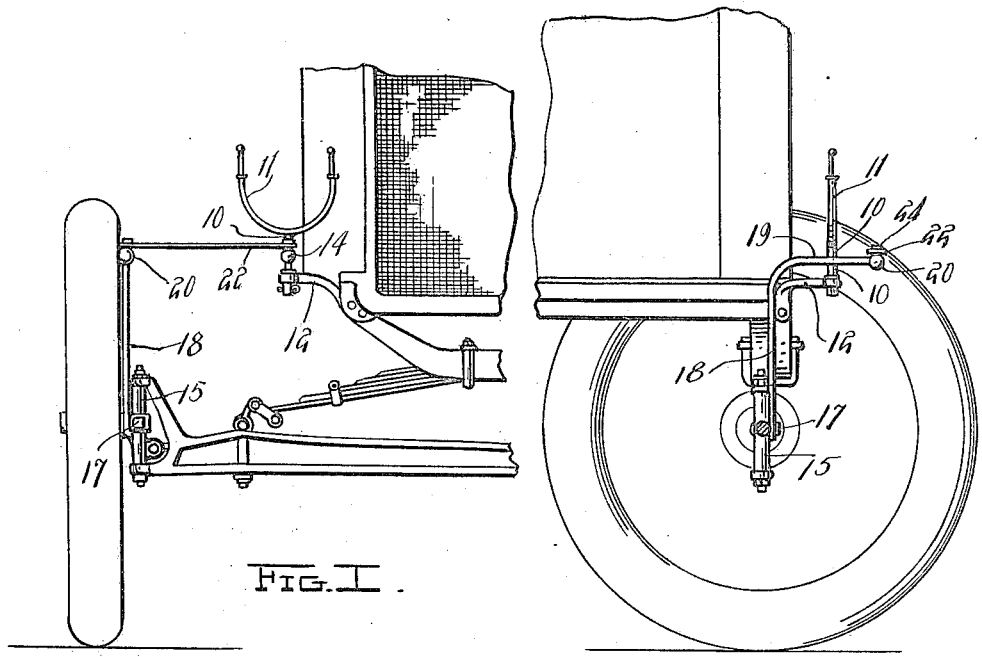
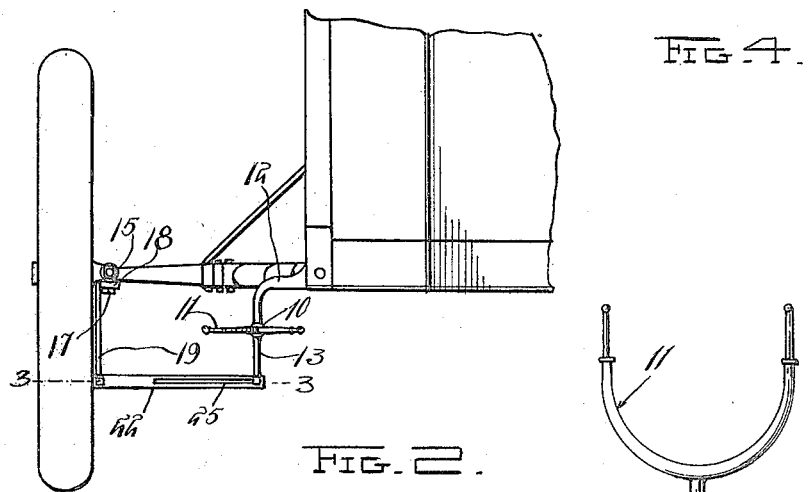
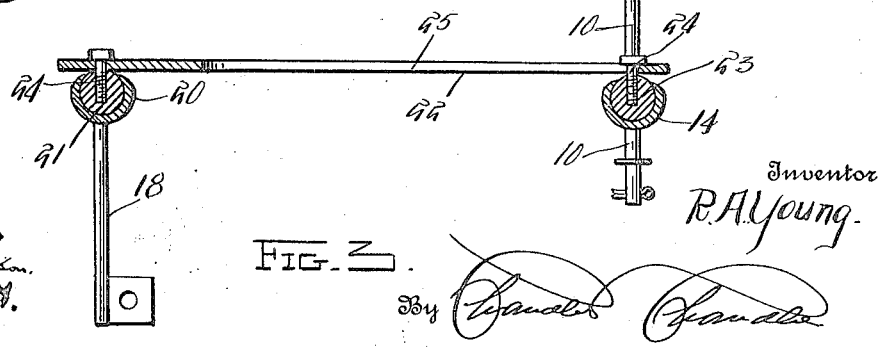
Inventor
R. A. Young

UNITED STATES PATENT OFFICE.

ROY A. YOUNG, OF CHESTER, VERMONT.

DIRIGIBLE HEADLIGHT.

1,231,980.   Specification of Letters Patent.   Patented July 3, 1917.

Application filed November 1, 1916. Serial No. 128,938.

*To all whom it may concern:*

Be it known that I, ROY A. YOUNG, a citizen of the United States, residing at Chester, in the county of Windsor, State of Vermont, have invented certain new and useful Improvements in Dirigible Headlights; and I do hereby declare the following to be a full, clear, and exact description of the invention, such as will enable others skilled in the art to which it appertains to make and use the same.

This invention relates to improvements in headlight supports for automobiles, and particularly to the class of dirigible headlight supports.

One object of the present invention is to provide a simple and cheap device of this character which can be readily applied to any of the automobiles now in use whereby the lamps of the automobile will be properly turned with the front wheels, to cast a large fan of light on the road ahead and in the direction in which the machine is turning.

Another object of the present invention is to improve and simplify the construction of devices of this character so that they can be manufactured and sold and mounted on automobiles at a comparatively low figure.

Other objects and advantages will be apparent from the following description when taken in connection with the accompanying drawing.

In the drawing:

Figure 1 is a front elevation of my improved headlight support mounted on an automobile.

Fig. 2 is a top plan view of the device, only such parts of the automobile being shown as are necessary to the proper illustration of the device.

Fig. 3 is an enlarged sectional view taken on the line 3—3 of Fig. 2.

Fig. 4 is a side elevation with parts of the automobile shown in section, and in fragment.

Referring particularly to the accompanying drawing, 10 represents the stems of the lamp supporting forks 11, which are rotatably mounted in the brackets 12 on the sides of the forward portion of the automobile. As both of these stems and the elements connected therewith, to be now described, are identical in construction, a description of one will, it is thought, be sufficient.

Extending forwardly from the stem, and forming an integral part thereof, is an arm 13, having a socket 14 formed on its front end. Secured to the outer portion 15 of the knuckle 16 of the front wheel of the automobile, by means of the bolt or screw 17, is an upwardly extending member 18, the upper portion of which is directed forwardly, as shown at 19. On the extremity of this member 19 is a spherical socket 20, in which is disposed a ball 21, carried by the adjacent end of a transverse rod 22. A ball 23 is carried by the other end of the rod 22, and is disposed in the socket 14, before-mentioned. The stem 24 of this ball 23 is disposed for slidable movement in a longitudinal slot 25 formed in the said rod.

It will thus be seen that when the front wheels of the automobile are turned, say, to the right, the right hand lamp will be turned in the same direction as the right hand wheel, while the left hand lamp will remain in its position directing its light straight ahead. This latter is due to the fact that the rod 25 of the left hand lamp support moves so as to permit the head of the ball carried thereby, to slide in the slot of the rod, thus producing no movement of the lamp support. At the right hand side, the end of the slot of the rod engages with the screw in the head of the ball and causes the swinging of the lamp support. Thus one lamp turns with the appropriate wheel while the other lamp remains stationary, thereby giving light ahead of the machine in a wide sweep of the road.

What is claimed is:

A dirigible lamp support for an automobile comprising a steering knuckle attached vertical member, a socketed element formed on one end of the said member, a lamp stem having a forwardly extending arm having a socket formed on its end, a transverse rod having a ball on one end engaged in the first socket, and a ball engaged in the second socket and provided with a stem, said rod being formed with a longitudinally extending slot for the slidable reception of the last-named stem.

In testimony whereof I affix my signature, in the presence of two witnesses.

ROY A. YOUNG.

Witnesses:
  ALBERT W. HARVEY,
  ROWENA HARLON.

Copies of this patent may be obtained for five cents each, by addressing the "Commissioner of Patents, Washington, D. C."